(12) United States Patent
Jha et al.

(10) Patent No.: US 11,293,611 B2
(45) Date of Patent: Apr. 5, 2022

(54) EXTERIOR HELICOPTER LIGHT

(71) Applicant: Goodrich Lighting Systems GmbH, Lippstadt (DE)

(72) Inventors: Anil Kumar Jha, Lippstadt (DE); Andre Hessling-Von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 17/151,372

(22) Filed: Jan. 18, 2021

(65) Prior Publication Data
US 2021/0262630 A1    Aug. 26, 2021

(30) Foreign Application Priority Data
Jan. 20, 2020   (EP) .................... 20152767

(51) Int. Cl.
| | | |
|---|---|---|
| *F21S 41/125* | (2018.01) | |
| *F21S 41/20* | (2018.01) | |
| *F21S 41/143* | (2018.01) | |
| *F21S 41/29* | (2018.01) | |
| *F21S 41/40* | (2018.01) | |
| *B64C 27/04* | (2006.01) | |

(Continued)

(52) U.S. Cl.
CPC .......... *F21S 41/125* (2018.01); *B64C 27/04* (2013.01); *B64D 47/02* (2013.01); *F21S 41/143* (2018.01); *F21S 41/28* (2018.01); *F21S 41/285* (2018.01); *F21S 41/29* (2018.01); *F21S 41/40* (2018.01); *F21W 2107/30* (2018.01); *F21Y 2105/18* (2016.08); *F21Y 2113/13* (2016.08); *F21Y 2115/10* (2016.08)

(58) Field of Classification Search
CPC ........ B64C 27/04; B64D 47/04; F21S 41/125; F21S 143/28–29; F21S 143/40; F21W 2107/30; F21Y 2105/18; F21Y 2113/13; F21Y 2115/10
USPC .......................................................... 362/470
See application file for complete search history.

(56) References Cited

U.S. PATENT DOCUMENTS

| | | | |
|---|---|---|---|
| 8,836,541 B2 * | 9/2014 | Fidanza | ................. B64D 47/04 340/946 |
| 9,567,102 B1 | 2/2017 | Ross | |

(Continued)

FOREIGN PATENT DOCUMENTS

| | | |
|---|---|---|
| DE | 102011119923 A1 | 5/2013 |
| EP | 3072818 A1 | 9/2016 |

OTHER PUBLICATIONS

Extended European Search Report for International Application No. 20152767.8 dated Aug. 5, 2020, 8 pages.

*Primary Examiner* — Jason M Han
(74) *Attorney, Agent, or Firm* — Cantor Colburn LLP

(57) ABSTRACT

An exterior helicopter light is configured to be mounted to a helicopter, in particular to an underside of the helicopter, the helicopter having a longitudinal axis (A). The exterior helicopter light comprises: a first set of light sources configured for emitting, in operation, light of a first color into a at least one rear sector of a ground below the helicopter, the at least one rear sector spatially extending around a projection of a rear portion of the helicopter onto the ground; and second set of light sources configured for emitting, in operation, light of a second color, which differs from the first color, into at least two forward sectors of the ground below the helicopter.

17 Claims, 6 Drawing Sheets

(51) Int. Cl.
*B64D 47/02* (2006.01)
*F21Y 105/18* (2016.01)
*F21Y 113/13* (2016.01)
*F21Y 115/10* (2016.01)
*F21W 107/30* (2018.01)

(56) References Cited

U.S. PATENT DOCUMENTS

| | | | |
|---|---|---|---|
| 9,850,003 B2 * | 12/2017 | Schoen | B64D 47/06 |
| 2005/0052880 A1 | 3/2005 | Buckingham et al. | |
| 2012/0025962 A1 | 2/2012 | Toll | |
| 2015/0130644 A1 | 5/2015 | Kiel | |
| 2016/0280368 A1 | 9/2016 | Schoen et al. | |
| 2016/0280393 A1 | 9/2016 | Mouton et al. | |
| 2016/0280396 A1 | 9/2016 | Schoen et al. | |
| 2016/0362193 A1 | 12/2016 | Bemis | |
| 2018/0237156 A1 | 8/2018 | Ross | |
| 2019/0281680 A1 | 9/2019 | Thorne | |

* cited by examiner

EXTERIOR HELICOPTER LIGHT

FOREIGN PRIORITY

This application claims priority to European Patent Application No. 20152767.8 filed Jan. 20, 2020, the entire contents of which is incorporated herein by reference.

TECHNICAL FIELD

The present invention is in the field of exterior helicopter lighting. The present invention in particular relates to an exterior helicopter light, to a helicopter comprising such an exterior helicopter light, and to a method of operating an exterior helicopter light.

BACKGROUND

When approaching a helicopter, passengers and ground personnel need to follow safety instructions. Such safety instructions may include staying away from the rear portion of the helicopter, which may include a tail rotor; approaching the helicopter from the side and within the pilot's line of vision, etc. Even after these safety instructions have been given, accidents may occur because the safety instructions are forgotten and/or ignored, in particular in stressful situations, such a rescue operations.

It would therefore be beneficial to provide support to persons approaching a helicopter, in order to reduce the risk of accidents.

SUMMARY

Exemplary embodiments of the invention include an exterior helicopter light which is configured to be mounted to a helicopter having a longitudinal axis, in particular to an underside of the helicopter. An exterior helicopter light according to an exemplary embodiment of the invention comprises a first set of light sources and a second set of light sources. The light sources of the first set are configured for emitting, in operation, light of a first color into at least one rear sector of a ground below the helicopter, the at least one rear sector spatially extending around a projection of a rear portion of the helicopter onto the ground. The light sources of the second set are configured for emitting, in operation, light of a second color, which differs from the first color, into at least two forward sectors of the ground below the helicopter. The at least two forward sectors are located on opposite lateral sides of the helicopter; and each of the at least two forward sectors extends over at least a portion of an area extending between a forward direction and a lateral direction of the helicopter.

Exemplary embodiments of the invention further include a helicopter with an exterior helicopter light according to an exemplary embodiment of the invention.

Exemplary embodiments of the invention also include a method of illuminating a portion of a ground below a helicopter, having a longitudinal axis, with an exterior helicopter light, wherein the exterior helicopter light comprises a plurality of light sources, and wherein the method includes: emitting light of a first color into at least one rear sector of a ground below the helicopter and emitting light of a second color, which differs from the first color, into two forward sectors of the ground below the helicopter. The at least one rear sector spatially extends around a projection of a rear portion of the helicopter onto the ground. The at least two forward sectors are located on opposite lateral sides of the helicopter, and each of the forward sectors extends over at least a portion of an area extending between a forward direction and a lateral direction of the helicopter.

An exterior helicopter light and a method of illuminating a portion of a ground below a helicopter according to exemplary embodiments of the invention provide a visual aid, indicating to persons on the ground which areas of the ground are dangerous and therefore should be avoided and which areas of the ground should preferably be used for approaching the helicopter. As a result, the safety of persons approaching and boarding the helicopter may be enhanced, even in stressful situations, and the risk of accidents caused by persons approaching the helicopter via unsafe areas may be considerably reduced.

In the context of the present invention, the term "area" refers to a portion of the ground below and in the vicinity of the helicopter. In the context of the present invention, an "area" of the ground is not restricted to a portion of the ground located directly under the helicopter, but an "area" of the ground also includes portions of the ground next to the helicopter, i.e. portions of the ground extending beyond a vertical projection of the helicopter onto the ground.

The term "sector" refers to a portion of the ground which is illuminated by a set of light sources of the exterior helicopter light. A "sector" may cover an "area" of the ground completely or only partially. In other words, an "area" may be completely or only partially illuminated by a set of light sources of the exterior helicopter light.

The "forward direction" is a direction extending forward from the front of the helicopter parallel to the longitudinal axis of the helicopter. The "lateral direction" is a direction which extends in a horizontal plane and which is orthogonal to the forward direction.

The term "in operation" refers to an operation of the exterior helicopter light, when the helicopter is on the ground or in a hover close to the ground. Accordingly, the exterior helicopter light is configured to provide the emission of light of a first color into at least one rear sector and the emission of light of a second color into at least two forward sectors, when the helicopter is on the ground or close to the ground. The described operation of the exterior helicopter light may therefore also be referred to as ground operation of the exterior helicopter light. The exterior helicopter light may be switched on by the pilot(s), when the helicopter is on the ground/close to the ground. Additionally/alternatively, the exterior helicopter light may enter the ground operation automatically, when the helicopter is on the ground/close to the ground. The exterior helicopter light may have suitable sensors for determining the proximity to the ground and/or may receive this information from another control unit within the helicopter. The exterior helicopter light may be switched off, when the helicopter is airborne, or may have a different function in the air, as will be laid out below.

In an embodiment, the at least two forward sectors are mirror-symmetric to each other with respect to the longitudinal axis of the helicopter. In an embodiment, the at least one rear sector is mirror-symmetric with respect to the longitudinal axis of the helicopter.

As the outer contour of a helicopter is typically basically symmetric with respect to its longitudinal axis, the dangerous area(s) which should be avoided and the safe areas, which should be used for approaching the helicopter, are usually symmetric with respect to the longitudinal axis of the helicopter as well. It is therefore beneficial that the at least one rear sector and the at least two forward sectors, indicating said dangerous/safe areas, are symmetric with respect to the longitudinal axis of the helicopter, too.

In an embodiment, the first color is red and/or the second color is green or blue. Red color provides for an intuitive signal for indicating dangerous and/or forbidden areas. Green or blue color provides for an intuitive signal for indicating safe areas. Thus, an exterior helicopter light, in which the first color of the emitted light is red and/or the second color is green or blue, is beneficial for reliably guiding persons to the safe areas and avoiding the dangerous areas.

In an embodiment, the exterior helicopter light further comprises a third set of light sources configured for emitting, in operation, light of a third color into at least two lateral sectors of the ground below the helicopter. The third color differs from the first color and from the second color; and the at least two lateral sectors are located between the at least one rear sector and one of the at least two forward sectors, respectively. Again, the term in operation refers to the operation of the helicopter light unit, when the helicopter is on the ground or close to the ground.

Lateral areas extending laterally from the helicopter are not as dangerous as the area around the rear portion of the helicopter. However, it is not as preferable to use these lateral areas for approaching the helicopter as using the forward areas, since they are outside the pilot's field of view. The lateral areas therefore may by indicated by a third color, which differs from the first and second colors, respectively.

In an embodiment, the exterior helicopter light further comprises a fourth set of light sources configured for emitting, in operation, light of a fourth color, which differs from the first and second colors, into an intermediate sector of the ground below the helicopter. The intermediate sector may be located between two of the forward sectors, the intermediate sector in particular may be mirror-symmetric with respect to the longitudinal axis of the helicopter. Again, the term in operation refers to the operation of the helicopter light unit, when the helicopter is on the ground or close to the ground.

The area located directly in front of the helicopter between the two forward sectors is not as preferable as the forward areas for approaching the helicopter. As this area is located directly in the field of view of the pilot, it is also not as dangerous as the rear area extending around the rear portion of the helicopter. The area located directly in front of the helicopter therefore may be marked with a fourth color, which differs from the first and second colors, respectively.

The third color may be identical with the fourth color, or the third and fourth colors may be different. The third color and the fourth color may be selected from colors including yellow, orange and white.

In an embodiment, the at least one rear sector has an opening angle of 120° (+/−60°) to 180° (+/−90°) centered at the longitudinal axis of the helicopter. Such an opening angle has been found to be well suited for covering the dangerous rear area surrounding the rear part of the helicopter.

In an embodiment, each forward sector has an opening angle between 30° and 90°, in particular an opening angle between 40° and 80°, more particularly an opening angle between 50° and 70°. Forward sectors having such an opening angle have been found as being well suited for indicating the safe areas in the vicinity of a helicopter, which should be preferably used for approaching the helicopter.

In an embodiment, the exterior helicopter light is configured for not illuminating at least one border sector, i.e. at least one sector located between two adjacent illuminated sectors, in order to cause a clear separation of adjacent sectors by generating a dark border sector sandwiched between said adjacent sectors. Such a configuration in particular prevents an undesired mixing of different colors of adjacent sectors, which could be confusing to persons approaching the helicopter.

The border sectors may have an opening angle of up to 5° for providing a clear separation of adjacent illuminated sectors.

The exterior helicopter light may be configured for generating dark border sectors at every interface between two adjacent illuminated sectors, respectively. Alternatively, the exterior helicopter light may be configured for generating dark border sectors at only one or only at some of the interfaces between two adjacent illuminated sectors.

In an embodiment, the exterior helicopter light comprises a light source support, in particular a circuit board, such as a printed circuit board, and the first set of light sources and/or the second set of light sources are arranged on the outer periphery of said light source support. The third set of light sources and/or the fourth set of light sources may also be arranged on the outer periphery of said light source support.

Such a combination of a light source support with a plurality of light sources allows for providing an exterior helicopter light which is capable of emitting light, in particular a plurality of sectors of light having different colors, over an area covering a full angular range of 360° around the exterior helicopter light. The light sources may be arranged so that they emit the light radially, when seen from the center of the light source support. As a result, the complete environment of the helicopter may be illuminated over the full angular range of 360° by employing only a single exterior helicopter light.

The light sources may be arranged on a side face of the light source support. The side face/outer periphery of the light source support may be circular or elliptical.

The first set of light sources and/or the second set of light sources and/or the third set of light sources and/or the fourth set of light sources may be LEDs. In particular, the first set of light sources may be LEDs of the first color and/or the second set of light sources may be LEDs of the second color and/or the third set of light sources may be LEDs of the third color and/or the fourth set of light sources may be LEDs of the fourth color.

At least some of the light sources, in particular the light sources of the first set of light sources emitting light into the at least one rear sector, may be configured for being operated in a flashing mode in order to enhance the warning effect of the light emitted by said light sources. The light sources may be configured for flashing with a frequency in the range of 0.5 Hz to 10 Hz, in particular with a frequency between 1 Hz and 5 Hz.

In an embodiment, the light sources are arranged with angular distances between 3° and 20° with respect to each other, with the angular distances being measured with respect to connection lines extending between a center of the light source support and the light sources. Such an arrangement of the light sources allows for emitting light in all directions, i.e. over a full 360° area surrounding the exterior helicopter light, using a reasonable number of light sources; in particular using 18 to 120 light sources mounted to the light source support. The given angular distances may apply to the first set of light sources and/or the second set of light sources and/or the third set of light sources and/or the fourth set of light sources.

In an embodiment, non-transparent shutter elements are arranged between adjacent light sources, in order to clearly separate the light beams emitted by adjacent light sources from each other. Separating the light beams emitted by adjacent light sources from each other in particular is beneficial at the interfaces between adjacent sectors of different colors of light, in order to prevent an undesired mixing of the different colors emitted into adjacent sectors.

In an embodiment, the exterior helicopter light comprises at least one optical element, which is configured for modifying the light emitted by the light sources in order to emit a plurality of light beams extending substantially radially from the center of the light source support.

In an embodiment, the at least one optical element includes a refractive annular optical element surrounding the light source support. Such a configuration allows providing a single optical element, which is configured for modifying the light emitted by all light sources of the exterior helicopter light and which may be produced and installed at low costs.

The refractive optical element may be made of glass or an appropriate plastic material, such as Polymethylmethacrylate (PMMA), Polycarbonate (PC), or silicone.

In an embodiment, the first and second sets of light sources are configured for emitting red light flashes in an airborne operation. The third and fourth sets of light sources, if present, may also be configured for emitting red light flashes in an airborne operation. In this way, the exterior helicopter light may act as a beacon light, i.e. as a red-flashing anti-collision light, when the helicopter is in the air. The beacon light functionality may be provided in addition to the visual aid functionality, described herein with respect to the ground operation.

Exemplary embodiments further include a helicopter in which the exterior helicopter light is mounted to an underside of a fuselage or to an undercarriage of the helicopter. An exterior helicopter light, which is mounted to an underside of a fuselage or to an undercarriage of the helicopter, is well-suited for illuminating the ground below the helicopter.

In an exemplary embodiment, the undercarriage of the helicopter includes at least one skid, and at least one exterior helicopter light is mounted to said at least one skid of the helicopter.

As stated above, exemplary embodiments of the invention include a method of illuminating a portion of a ground below a helicopter. Said method may comprise emitting light of a third color, which differs from the first and second colors, into two lateral sectors of the ground below the helicopter, the two lateral sectors being located between the at least one rear sector and one of the at least two forward sectors, respectively. Additionally/alternatively said method may comprise emitting light of a fourth color, which differs from the first and second colors, into an intermediate sector of the ground below the helicopter, the intermediate sector being located between the at least two forward sectors, wherein the intermediate sector in particular is mirror-symmetric with respect to the longitudinal axis of the helicopter.

BRIEF DESCRIPTION OF THE DRAWINGS

Further exemplary embodiments are described with respect to the accompanying drawings, wherein.

DETAILED DESCRIPTION

Figure 1:
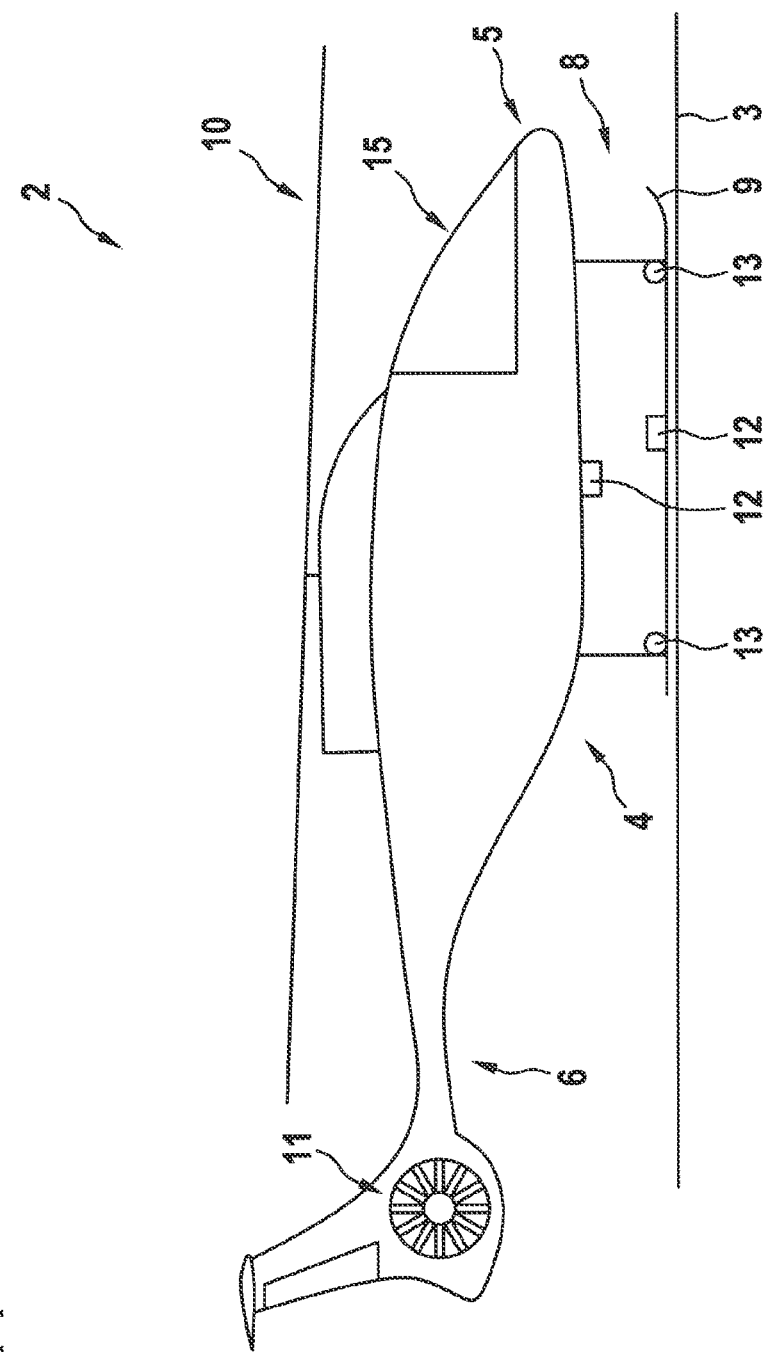
FIG. 1 shows a schematic side view of a helicopter which is equipped with two exterior helicopter lights according to exemplary embodiments of the invention.

FIG. 1 shows a schematic side view of a helicopter 2, which is equipped with two exterior helicopter lights 12 according to exemplary embodiments of the invention.

The helicopter 2 comprises a fuselage 4 having a front portion or nose 5, including a cockpit 15, and a rear portion or tail 6. An undercarriage 8, mounted to an underside of the fuselage 4, supports the helicopter 2 on a ground 3. In the embodiment depicted in FIG. 1, the undercarriage 8 comprises two skids 9 extending parallel to each other in a longitudinal direction. In FIG. 1, the longitudinal direction extends horizontally, parallel to the ground 3, from left to right. Only one of the skids 9 is visible in the side view depicted in FIG. 1. Alternatively or additionally to the skids 9, rollers 13 may by mounted to the undercarriage 8 for allowing the helicopter 2 to move on a solid ground 3.

The helicopter 2 comprises a main rotor 10 on top of the fuselage 4 and a tail rotor 11 provided in or at the tail 6 of the fuselage 4. In an alternative embodiment, which is not depicted on the figures, the helicopter 2 may comprises two main rotors 10 arranged in a co-extensive manner on top of the fuselage 4.

A first exterior helicopter light 12 according to an exemplary embodiment of the invention is mounted to an underside of the fuselage 4. In the embodiment depicted in FIG. 1, the exterior helicopter light 12 is mounted to a central portion of the fuselage 4. The exterior helicopter light 12 also may be mounted below the front portion 5 and/or below the tail 6 of the fuselage 4.

In the embodiment depicted in FIG. 1, a second exterior helicopter light 12 is mounted to the undercarriage 8 of the helicopter 2.

The helicopter 2 shown in FIG. 1 is equipped with two exterior helicopter lights 12 for illustrative purposes. The helicopter 2 may also be equipped with only one or with more than two exterior helicopter lights 12.

Figure 2:
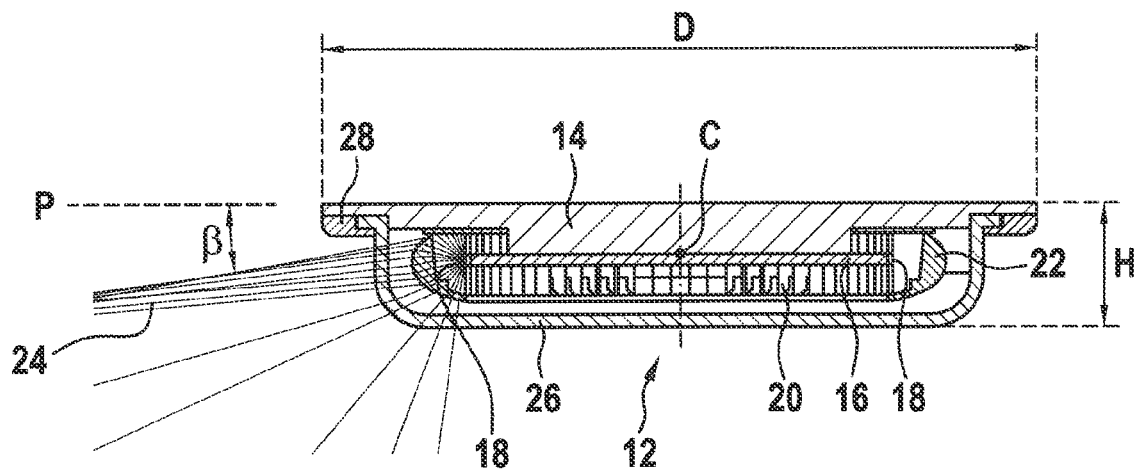
FIG. 2 shows a vertical cross-sectional view of an exterior helicopter light according to an exemplary embodiment of the invention.
Figure 3:
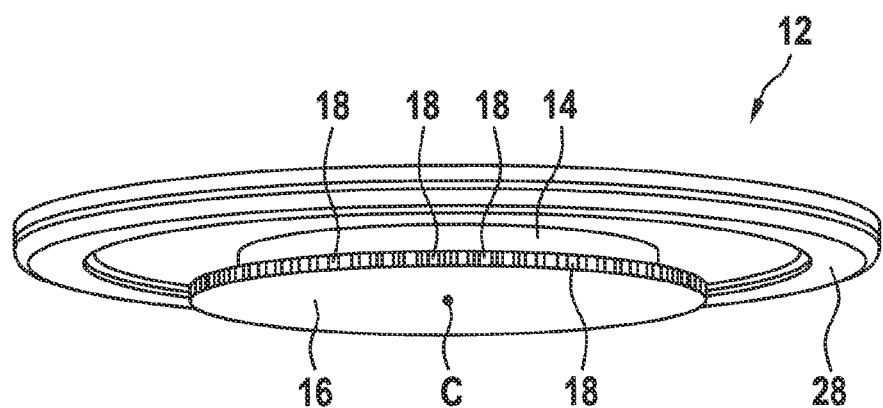
FIG. 3 shows a perspective view of the exterior helicopter light depicted in FIG. 2, in which the outer cover, the optical element and the shutter elements have been removed.
Figure 4:
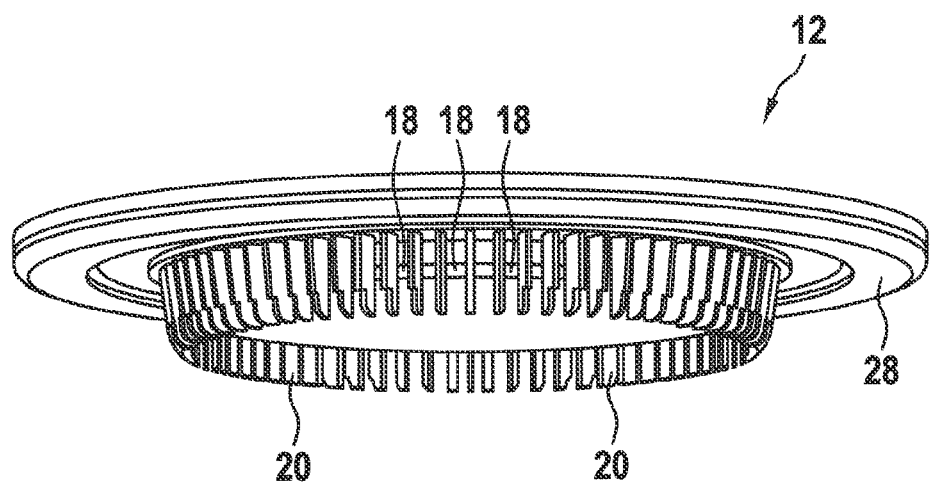
FIG. 4 shows a perspective view of the exterior helicopter light depicted in FIGS. 2 and 3, in which the outer cover and the optical element have been removed.
Figure 5:
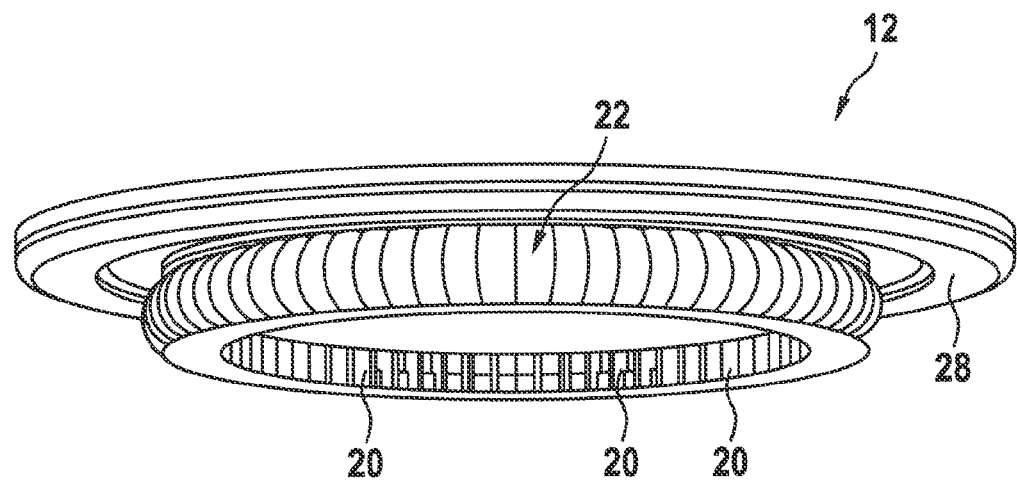
FIG. 5 shows a perspective view of the exterior helicopter light depicted in FIGS. 2 to 4, in which only the outer cover has been removed.
Figure 6:
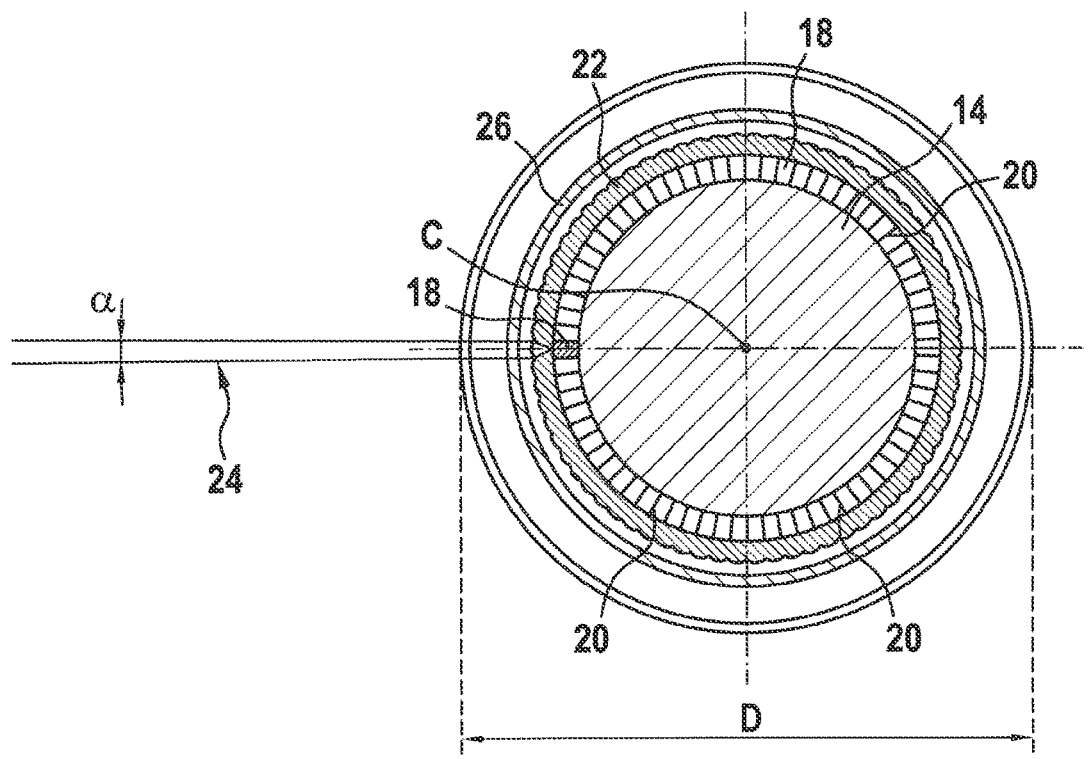
FIG. 6 shows a horizontal cross-sectional view of the exterior helicopter light depicted in FIGS. 2 to 5.

FIG. 2 depicts a vertical cross-sectional view of an exterior helicopter light 12 according to an exemplary embodiment of the invention. FIGS. 3 to 5 depict perspective views of the exterior helicopter light 12 in different states of assembly. FIG. 6 depicts a horizontal cross-sectional view of the exterior helicopter light 12.

The exterior helicopter light 12 comprises a base plate 14, which may be mounted to the fuselage 4 or to the undercarriage 8 of the helicopter 2, as it is depicted in FIG. 1.

The base plate 14 supports a light source support 16, e.g. a circuit board, in particular a printed circuit board, supporting a plurality of light sources 18, in particular light emitting diodes (LEDs). As best seen from FIG. 3, the light source support 16 may have a round periphery, in particular a circular or elliptical periphery, and the light sources 18 may be mounted to said outer periphery for emitting light radially outwards from the light source support 16.

The exterior helicopter light 12 further comprises a plurality of shutter elements 20 (see also FIG. 4) forming a ring around the light source support 16. The shutter elements 20 extend radially with respect to a center C of the light source support 16. As a result, a radially extending light channel is formed between each pair of adjacent shutter elements 20, respectively.

A refractive optical element 22 surrounds the ring of shutter elements 20 (see also FIG. 5). The refractive optical element 22 may be made of glass or an appropriate plastics material, such as Polymethylmethacrylate (PMMA), Polycarbonate (PC), or silicone. The refractive optical element 22 is configured for modifying the light, which is emitted by the plurality of light sources 18 and passes through the light channels formed between the shutter elements 20.

The refractive optical element 22 may in particular be configured to form a plurality of light beams 24 emitted from the plurality of light channels, each light beam 24 having a predefined opening angle α, e.g. an opening angle α of 3° to 20°, in particular an opening angle α of 5° to 10°, more particular an opening angle α of 5°, when projected onto a horizontal plane P, which is arranged parallel to the plane of the light source support 16 (cf. FIG. 6). Each of the light beams 24 may be oriented downwards towards the ground 3 at an angle β with respect to the horizontal plane P (cf. FIG. 2). The angle β may be in the range of 2° to 10°; the angle β may in particular be in the range of 4° to 6°, β more particularly may be 5°.

The opening angle α of each light beam 24 may be set as a function of the number of light channels and light sources 18 arranged on the outer periphery of the light source support 16. The opening angle α of the light beams 24 in particular is set so that all light beams 24, in combination, cover a full circle of 360° around the center C of the light source support 16. In other words, an opening angle α of approximately 5°, as it is exemplarily depicted in FIG. 6, corresponds to at least 72 light sources 18 being arranged along the outer periphery of the light source support 16.

Generally, the opening angle α may be increased, when the number of light sources 18 is reduced; and the opening angle α may be reduced, if the number of light sources 18 is increased, in order to ensure that the combination of all light beams 24 covers the complete circle of 360°.

Light sources 18 emitting light of different colors may be employed in different angular portions along the outer periphery of the light source support 16. This allows generating a desired light pattern 30 on the ground 3 below and in the vicinity of the helicopter 2. In particular, a plurality of sets of adjacent light sources 18 may be formed. All light sources 18 of the same set may emit light having the same color, and the different sets may emit light having different colors or the same color.

The light sources 18, the shutter elements 20 and the refractive optical element 22 are covered by a refractive housing or cover lens 26, which is attached to the base plate 14 by a circular lens retainer 28 (cf. FIG. 2). The refractive housing or cover lens 26 protects the light sources 18, the shutter elements 20 and the refractive optical element 22 from adverse environmental influences, such as dirt, water, moisture and/or mechanical influences.

The exterior helicopter light 12 may have a diameter D of 100 mm to 150 mm in the horizontal plane P, in particular a diameter D between 110 mm and 130 mm, more particularly a diameter of 120 mm. The height H of the exterior helicopter light 12 may be in the range of 20 mm to 50 mm. The exterior helicopter light 12 in particular may have a height H of 30 mm.

Figure 7:
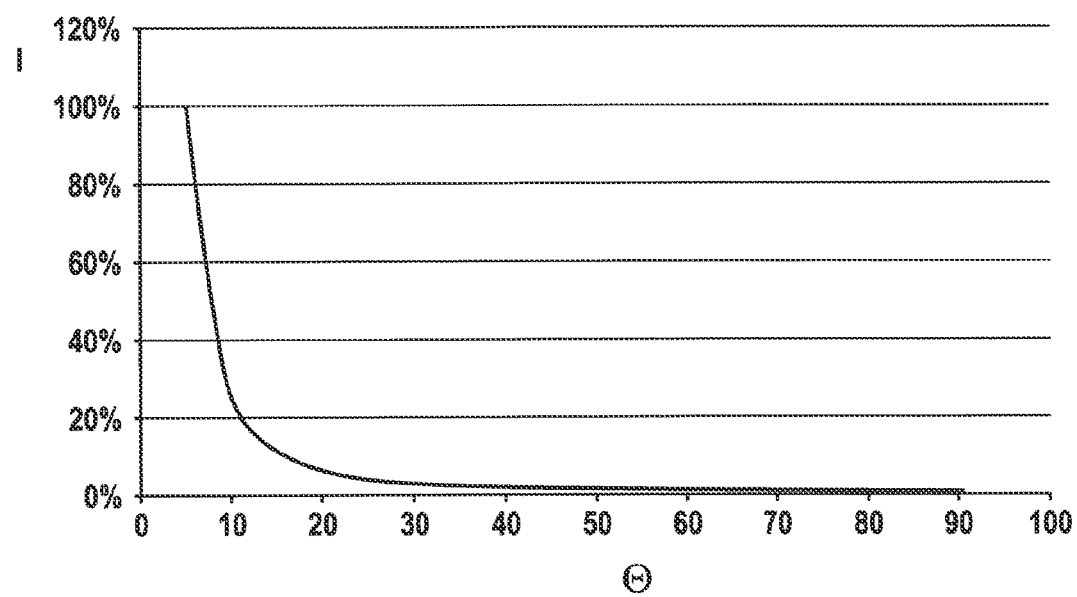
FIG. 7 is a diagram illustrating the relative intensity of the light emitted by a single light beam as a function of the angle in a vertical plane.

FIG. 7 depicts a diagram illustrating the relative intensity I of the light emitted by a single light beam 24 as a function of the angle Θ in a vertical plane.

The maximum intensity (100%) at approximately 5°, e.g. at the angle β, may be at least 2500 cd, in order to achieve an illumination of at least 100 lx in a distance of 5 m at the ground 3 all around the helicopter 2.

Figure 8:
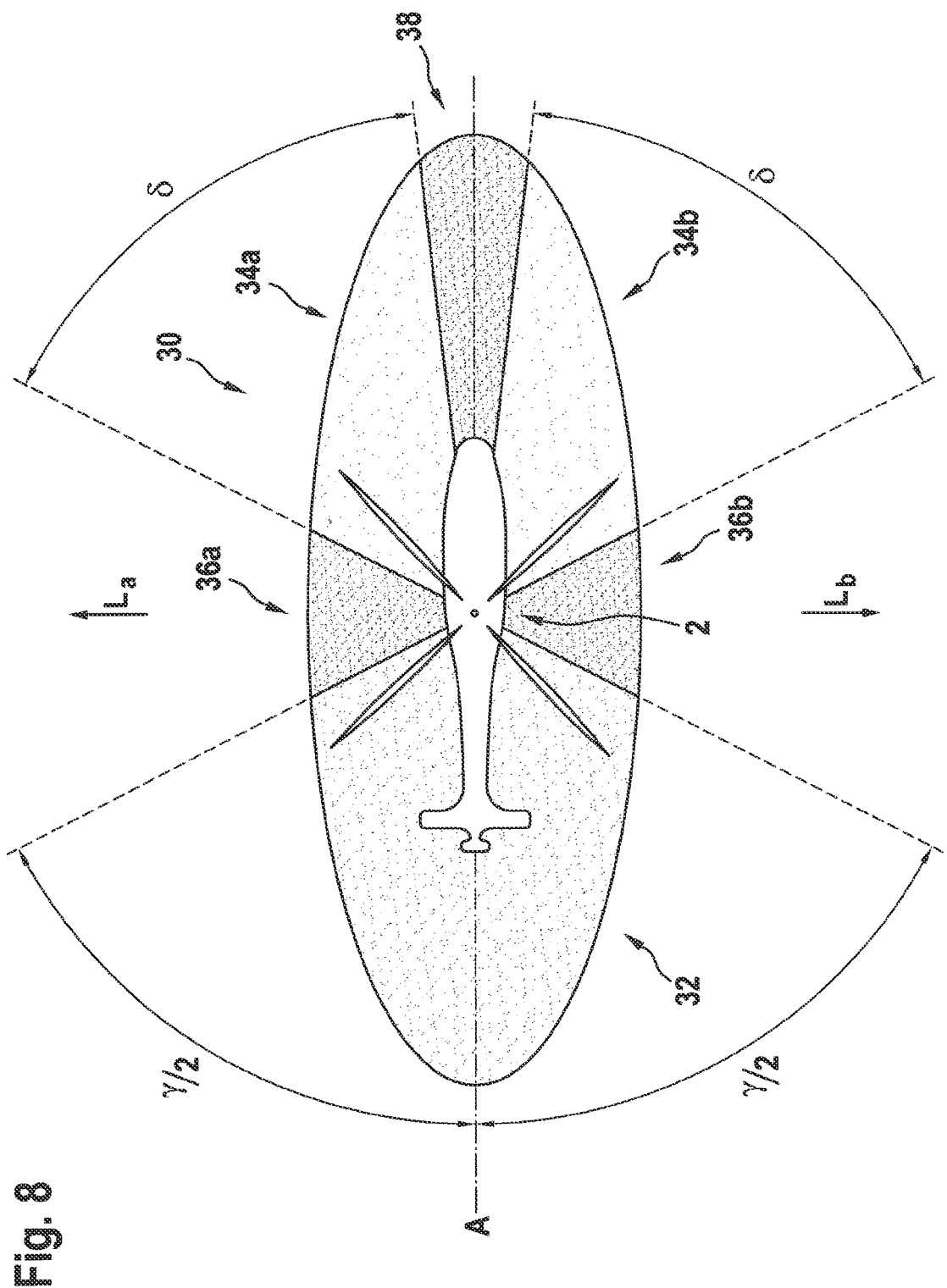
FIG. 8 shows a schematic plan view of a light pattern emitted by an exterior helicopter light according to an exemplary embodiment of the invention.

FIG. 8 shows a schematic plan view of a light pattern 30 generated by an exterior helicopter light 12 according to an exemplary embodiment of the invention, as viewed from a position above the helicopter 2.

The plurality of light sources 18 include a first set of light sources which are configured for emitting, in operation, light of a first color into a rear sector 32 of the ground 3 below the helicopter 2. The rear sector 32 spatially extends around a projection of the rear portion 6 of the helicopter 2 onto the ground 3. Again, the term in operation refers to the operation of the exterior helicopter light, when the helicopter is on the ground or close to the ground.

The rear sector 32 in particular has an opening angle of γ=120° (+/−60°) to 180° (+/−90°), centered at the longitudinal axis A of the helicopter 2.

Due to the vicinity of the tail rotor 11 and as it is out of sight of a pilot sitting in the cockpit 15, the rear area around the rear portion (tail) 6 of the helicopter 2 is a very dangerous area, which should be avoided by any persons approaching the helicopter 2. Thus, light sources emitting red light may be used for illuminating the rear sector 32, in order to indicate that people should not enter said area.

On the other hand, forward areas in front of the helicopter 2, with the exception of an area directly in front of the helicopter 2, which are in the field of view of the pilot of the helicopter, are relatively safe areas and preferable for approaching the helicopter 2.

The plurality light sources 18 include a second set of light sources which are configured for emitting, in operation, light of a second color, which differs from the first color, into two forward sectors 34a, 34b of the ground 3 below and in front of the helicopter 2.

The two forward sectors 34a, 34b are located on opposite lateral sides of the longitudinal axis A of the helicopter 2, and each of the forward sectors 34a, 34b covers at least a portion of an area extending between the longitudinal axis A of the helicopter and a lateral direction La, Lb oriented orthogonally to said longitudinal axis A.

I.e., each of the two forward sectors 34a, 34b at maximum covers an angular area of 90° extending between the longitudinal axis A and a lateral direction La, Lb, respectively. The two forward sectors 34a, 34b may also be referred to as left and right forward sectors.

Each forward sector 34a, 34b, however, may have an opening angle δ of less than 90°, for example an opening angle δ in the range of 30° to 90°, in particular an opening angle δ between 40° and 80°, more particularly an opening angle δ between 50° and 70°.

The two forward sectors 34a, 34b may be mirror-symmetric to each other with respect to the longitudinal axis A of the helicopter 2.

As the areas covered by the forward sectors 34a, 34b are the safest areas for approaching the helicopter 2, light sources emitting green or blue light may be used for illuminating the forward sectors 34a, 34b.

Areas extending laterally from the helicopter 2 are not as dangerous as the rear portion of the helicopter 2. However, since they are outside the pilot's field of view, they are not as preferable as the previously mentioned forward areas for approaching the helicopter 2. These areas may by marked by employing a third set of light sources emitting light into two lateral sectors 36a, 36b located on opposing lateral sides of the helicopter 2. The light sources of the third set are configured for emitting, in operation, light of a third color, which differs from the first and second colors. Each lateral sector 36a, 36b is located between the rear sector 32 and one of the forward sectors 34a, 34b, respectively.

As approaching the helicopter 2 in the areas covered by the lateral sectors 36a, 36b is not as dangerous as approaching the helicopter 2 via the rear area covered by the rear sector 32, but not as safe and preferable as approaching the helicopter via the forward areas covered by the forward sectors 34a, 34b, the third color, which is used for illuminating the lateral sectors 36a, 36b, may be yellow, orange or white.

It is pointed out that the provision of lateral sectors 36a, 36b, into which light of a third color is emitted, is optional. The rear sector 32 and the forward sectors 34a, 34b may directly border each other.

An area located directly in front of the helicopter 2 is not preferable for approaching the helicopter 2, either. However, as this area is directly in the line of sight of the pilot, approaching the helicopter 2 via this front area is not as dangerous as approaching the helicopter 2 from behind.

Thus, the exterior helicopter light 12 may comprise a fourth set of light sources configured for emitting, in operation, light of a fourth color, which differs from the first and second colors, into an intermediate sector 38 of the ground below and in front of the helicopter 2. The intermediate sector 38 extends between the two forward sectors 34a, 34b along the longitudinal axis A. The intermediate sector 38 in particular may be mirror-symmetric with respect to the longitudinal axis A of the helicopter 2.

The fourth color may be yellow, orange or white. The fourth color may be identical with or different from the third color.

It is pointed out that the provision of the intermediate sector 38, into which light of a fourth color is emitted, is optional. The two forward sectors 34a, 34b may directly border each other. While such a set-up may be perceived by an observer as having a continuous forward sector that extends to both sides of the longitudinal axis A, such a set-up is considered herein as having two forward sectors that directly border each other. In other words, it is understood that the two forward sectors 34a, 34b may both extend to the longitudinal axis A and may blend into each other and that such a configuration is encompassed by the wording of at least two forward sectors located on opposite lateral sides of the helicopter.

The first, second, third and fourth sets of light sources may, in combination, generate a light pattern 30 as it is depicted in FIG. 8, comprising a rear sector 32 indicating the very dangerous area around the rear portion (tail) 6 of the helicopter 2, two forward sectors 34a, 34b indicating safe areas, which are preferable to be used for approaching the helicopter 2, and lateral and intermediate sectors 36a, 36b, 38, indicating areas which are not as dangerous as the rear area, but not as safe and preferable as the forward areas.

The opening angles of the sectors 32, 34a, 34b, 36a, 36b, 38 may depend on the design of the helicopter 2 and may be set individually for each type of helicopter 2.

Optionally, at least some of the light sources 18 may be color-switchable light sources 18, which allow selectively emitting light of different colors. In such a configuration, all light sources 18 may be controlled to emit red light during takeoff, landing and/or hovering of the helicopter 2, in order to indicate that it is not safe to approach the helicopter 2. Also, all light sources 18 may be controlled to emit red light flashes in an airborne operation, thus providing beacon light functionality. When the helicopter 2 has landed, the pilot may switch the lights sources 18 to emit a multi-color light pattern similar to the light pattern depicted in FIG. 8, in order to signal that the helicopter 2 is ready for boarding and may be approached, preferably via the safe areas which are illuminated by the forward sectors 34a, 34b of light emitted by light sources of the first set of light sources.

Color-switchable light sources 18, which allow selectively emitting light of different colors, further allow for adapting the exterior helicopter light 12 to different types of helicopters 2 by selectively switching the color of the light emitted by each of the light sources 18, in order to generate the desired light distribution. In consequence, the same exterior helicopter light 12 may be used in combination with different types of helicopters 2, without modifying the physical configuration of the exterior helicopter light 12.

The light sources 18 of at least one set of light sources, in particular of the set of light sources emitting red light, may be operated in a flashing mode, in order to enhance the warning effect of the emitted light.

Figure 9:
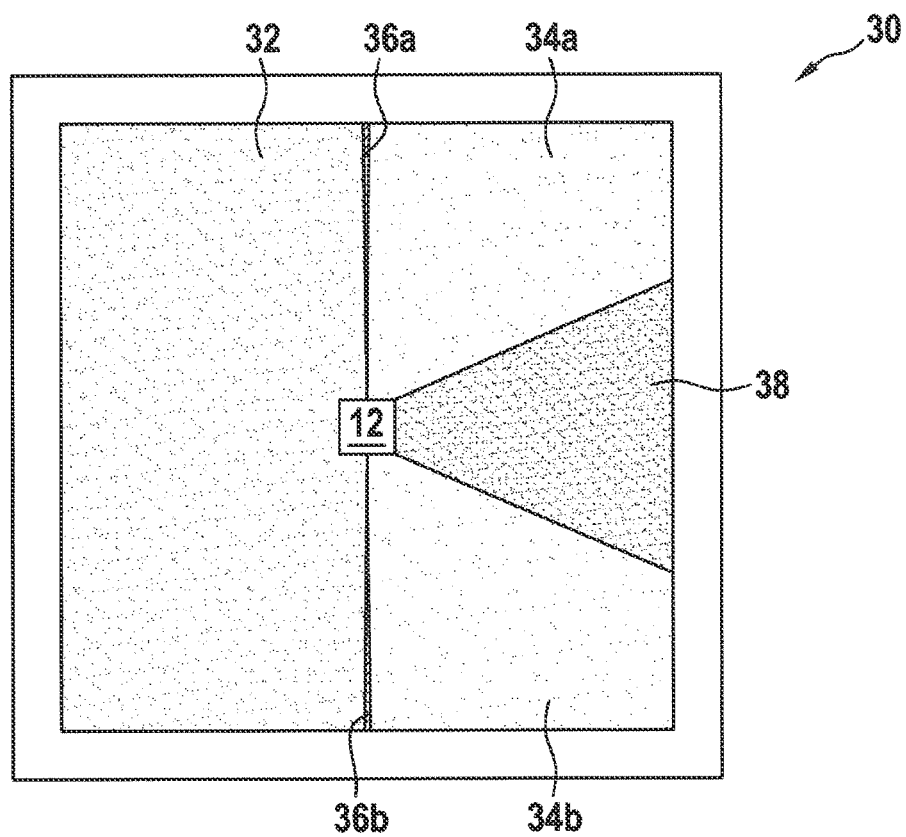
FIG. 9 shows a schematic plan view of a further light pattern emitted by an exterior helicopter light according to an exemplary embodiment of the invention, including overlaps between light beams emitted into adjacent sectors.

FIG. 9 depicts a schematic top view of a light pattern 30 generated by an exterior helicopter light 12 according to an exemplary embodiment of the invention without the helicopter 2.

In this light pattern 30, the opening angle α of the individual light channels is somewhat larger than 5°. As a consequence, there is a slight overlap between adjacent light beams 24. At the interfaces between adjacent sectors 34a, 34b, 36a, 36b, 38 of light having different colors, the overlap of adjacent light beams 24 results in a mixture of the different colors. This may be beneficial for generating the lateral sectors 36a, 36b by mixing light from the rear sector 32 and the forward sectors 34a, 34b.

However, the accidental overlap of light beams 24 of different sectors 32, 34a, 34b may also result in undesired effects, which may irritate and confuse persons approaching the helicopter 2. The mixing may be reduced by reducing the opening angle α of the light beams 24, thereby minimizing the overlap between adjacent light beams 24.

Figure 10:
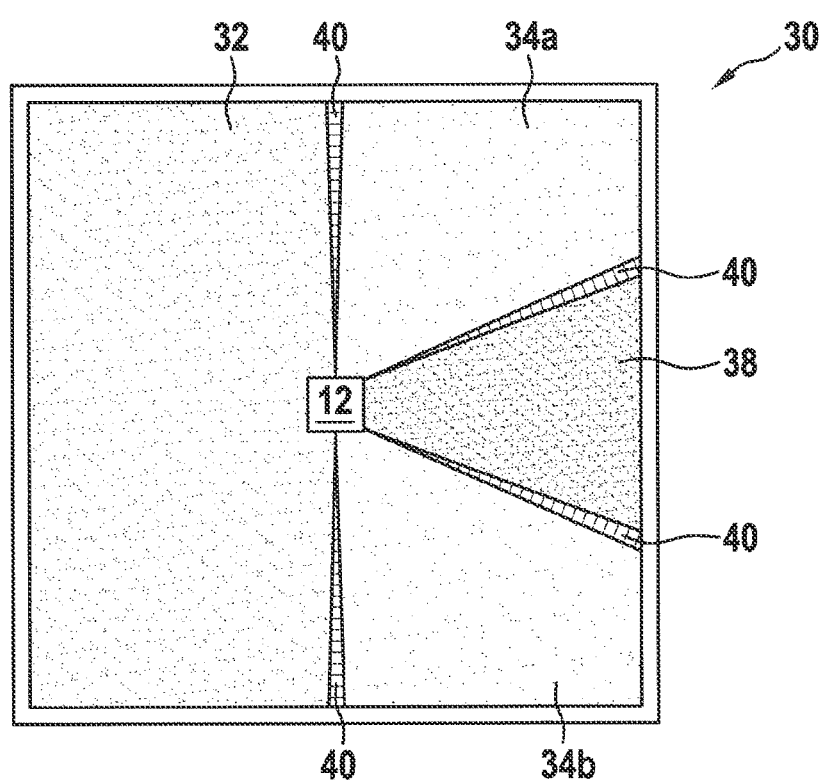
FIG. 10 shows a schematic plan view of a further light pattern emitted by an exterior helicopter light according to an exemplary embodiment of the invention, comprising dark zones between light beams emitted into adjacent sectors.

Another option for avoiding an undesired mixing of the colors at the interfaces between adjacent sectors 32, 34a, 34b, 38 is generating dark border sectors 40 at the interfaces by switching off at least one of the light sources at the borders between adjacent sectors 32, 34a, 34b, 38. Such a configuration, in which dark border sectors 40 are formed between adjacent sectors 32, 34a, 34b, 38, is depicted in FIG. 10. The dark border sectors 40 formed between adjacent sectors 32, 34a, 34b, 38 result in a clearly defined separation of adjacent sectors 32, 34a, 34b, 38 having different colors.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. Exterior helicopter light configured to be mounted to a helicopter, in particular to an underside of the helicopter, the helicopter having a longitudinal axis, the exterior helicopter light comprising:
a first set of light sources configured for emitting, in operation, light of a first color into at least one rear sector of a ground below the helicopter, the at least one rear sector spatially extending around a projection of a rear portion of the helicopter onto the ground; and
a second set of light sources configured for emitting, in operation, light of a second color, which differs from the first color, into at least two forward sectors of the ground below the helicopter,
wherein the light, which is emitted into at least two forward sectors, has the same color;
wherein the at least two forward sectors are located on opposite lateral sides of the helicopter; and
wherein each of the at least two forward sectors extends over at least a portion of an area extending between a forward direction and a lateral direction of the helicopter.

2. An exterior helicopter light according to claim 1, wherein the at least two forward sectors are mirror-symmetric to each other with respect to the longitudinal axis of the helicopter; or
wherein the at least one rear sector is mirror-symmetric with respect to the longitudinal axis of the helicopter.

3. An exterior helicopter light according to claim 1, wherein the first color is red and/or wherein the second color is green or blue.

4. An exterior helicopter light according to claim 1, wherein the exterior helicopter light further comprises:
a third set of light sources configured for emitting, in operation, light of a third color, which differs from the first and second colors, into at least two lateral sectors of the ground below the helicopter,
wherein each of the at least the two lateral sectors is located between the at least one rear sector and one of the at least two forward sectors,
wherein the third color is yellow, orange or white.

5. An exterior helicopter light according to claim 4, wherein the exterior helicopter light further comprises:
a fourth set of light sources configured for emitting, in operation, light of a fourth color, which differs from the first and second colors, into an intermediate sector of the ground below the helicopter, the intermediate sector being located between two of the forward sectors,
wherein the intermediate sector is mirror-symmetric with respect to the longitudinal axis of the helicopter, and
wherein the fourth color is identical with the third color.

6. An exterior helicopter light according to claim 1, wherein the exterior helicopter light further comprises:
a fourth set of light sources configured for emitting, in operation, light of a fourth color, which differs from the first and second colors, into an intermediate sector of the ground below the helicopter, the intermediate sector being located between two of the forward sectors,
wherein the intermediate sector is mirror-symmetric with respect to the longitudinal axis of the helicopter.

7. An exterior helicopter light according to claim 6, wherein the fourth color is yellow, orange or white.

8. An exterior helicopter light according to claim 1, wherein the at least one rear sector has an opening angle ($\gamma$) of 120° to 180° around the longitudinal axis of the helicopter and wherein each forward sector has an opening angle ($\delta$) between 30° and 90.

9. An exterior helicopter light according to claim 1, configured for not illuminating a border sector, having an opening angle of up to 5°, between two adjacent sectors.

10. An exterior helicopter light according to claim 1, comprising a light source support, in particular a circuit board, wherein the first set of light sources or the second set of light sources are arranged on the outer periphery of the light source support.

11. An exterior helicopter light according to claim 10, further comprising
at least one optical element configured for modifying the light emitted by the first set of light sources and/or the second set of light sources;
wherein the at least one optical element includes a refractive annular optical element surrounding the light source support.

12. An exterior helicopter light according to claim 1, wherein the first set of light sources and/or the second set of light sources are arranged with angular distances between 3° and 20° with respect to each other.

13. An exterior helicopter light according to claim 1, further comprising shutter elements arranged between adjacent light sources.

14. An exterior helicopter light according to claim 1, further comprising
at least one optical element configured for modifying the light emitted by the first set of light sources and/or the second set of light sources;
wherein the at least one optical element in particular includes a refractive annular optical element surrounding the light source support.

15. An exterior helicopter light according to claim 1, wherein the first and second sets of light sources are configured for emitting red light flashes in an airborne operation.

16. A helicopter comprising:
an exterior helicopter light according to claim 1,
wherein the exterior helicopter light is mounted to an underside of a fuselage or to an undercarriage of the helicopter.

17. A method of illuminating a portion of a ground below a helicopter, having a longitudinal axis (A), with an exterior helicopter light comprising a plurality of light sources on an underside of the helicopter, wherein the method includes:
emitting light of a first color into at least one rear sector of a ground below the helicopter, the at least one rear sector spatially extending around a projection of a rear portion of the helicopter onto the ground; and
emitting light of a second color, which differs from the first color, into at least two forward sectors of the ground below the helicopter,
wherein the light, which is emitted into at least two forward sectors, has the same color;
wherein the at least two forward sectors are located on opposite lateral sides of the helicopter; and wherein each of the at least two forward sectors extends over at least a portion of an area extending between a forward direction and a lateral direction of the helicopter.

* * * * *